United States Patent
Lee et al.

(10) Patent No.: US 11,895,052 B2
(45) Date of Patent: Feb. 6, 2024

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 17/578,077

(22) Filed: Jan. 18, 2022

(65) Prior Publication Data
US 2022/0239428 A1    Jul. 28, 2022

(30) Foreign Application Priority Data

Jan. 18, 2021   (KR) .................. 10-2021-0006607

(51) Int. Cl.
*H04L 5/00*   (2006.01)
*H04W 48/10*  (2009.01)

(52) U.S. Cl.
CPC .......... *H04L 5/0048* (2013.01); *H04W 48/10* (2013.01)

(58) Field of Classification Search
None
See application file for complete search history.

(56) References Cited

U.S. PATENT DOCUMENTS

2019/0327764 A1* 10/2019 Yoo ..................... H04L 1/18
2022/0255701 A1*  8/2022 Matsumura ....... H04L 25/03866

* cited by examiner

*Primary Examiner* — Hong S Cho
(74) *Attorney, Agent, or Firm* — Fish & Richardson P.C.

(57) ABSTRACT

According to an embodiment of the present disclosure, a user equipment (UE) may receive a first synchronization signal block (SSB) among a plurality of SSBs, receive information on one or more group radio network temporary identifiers (G-RNTIs) through higher layer signaling, and receive a physical downlink control channel (PDCCH) based on the first SSB and the one or more G-RNTIs. The PDCCH received by the UE may be a PDCCH for a multicast broadcast service (MBS) associated with a first G-RNTI selected from among the one or more G-RNTIs, and the PDCCH for the MBS associated with the first G-RNTI may be repeated for each of the plurality of SSBs. In this case, the number of repetitions of the PDCCH for the MBS for each SSB may be determined based on information configured for the first G-RNTI.

12 Claims, 14 Drawing Sheets

(a)

(b)

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of Korean Application No. 10-2021-0006607, filed on Jan. 18, 2021, which is hereby incorporated by reference as if fully set forth herein.

TECHNICAL FIELD

The present disclosure relates to a wireless communication system, and more particularly, to a method and apparatus for transmitting and receiving radio signals.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, there is provided a method of receiving a signal by a user equipment (UE) in a wireless communication system. The method may include: receiving a first synchronization signal block (SSB) among a plurality of SSBs; receiving information regarding one or more group radio network temporary identifiers (G-RNTIs) through higher layer signaling; and receiving a physical downlink control channel (PDCCH) based on the first SSB and the one or more G-RNTIs. The PDCCH received by the UE may be a PDCCH for a multicast broadcast service (MBS) associated with a first G-RNTI selected from among the one or more G-RNTIs, and the PDCCH for the MBS associated with the first G-RNTI may be repeated for each of the plurality of SSBs. A repetition number of the PDCCH for the MBS for each SSB may be determined based on information configured for the first G-RNTI.

The PDCCH for the MBS received by the UE may be repeated for the first SSB.

A different PDCCH repetition number may be configured for each G-RNTI.

The PDCCH for the MBS may be related to reception of a multicast traffic channel (MTCH), which is an MBS logical channel.

The UE may be configured to receive a physical downlink shared channel (PDSCH) for the MBS based on the PDCCH for the MBS.

The UE may be configured to generate a scrambling sequence for the PDSCH for the MBS based on the first G-RNTI.

The first G-RNTI may be set to an identifier (ID) for initialization of the scrambling sequence generation.

The PDSCH for the MBS may be repeated based on a repetition number indicated by UE-group downlink control information (DCI) carried by the PDCCH for the MBS.

A repetition number of the PDCCH for the MBS for the first SSB may be different from a repetition number of the PDCCH for the MBS for a second SSB among the plurality of SSBs.

In another aspect of the present disclosure, there is provided a computer-readable storage medium having stored thereon a program for executing the above-described method.

In another aspect of the present disclosure, there is provided a UE configured to perform the method.

In another aspect of the present disclosure, there is provided a device configured to control the UE configured to perform the method.

In another aspect of the present disclosure, there is a provided a method of transmitting a signal by a base station (BS) in a wireless communication system. The method may include: transmitting a synchronization signal and a physical broadcast channel (PBCH) based on a plurality of SSBs; transmitting information regarding one or more G-RNTIs through higher layer signaling; and transmitting a PDCCH based on the plurality of SSBs and the one or more G-RNTIs. The transmitted PDCCH may include a PDCCH for an MBS associated with a first G-RNTI among the one or more G-RNTIs, and the PDCCH for the MBS associated with the first G-RNTI may be repeated for each of the plurality of SSBs. A repetition number of the PDCCH for the MBS for each SSB may be determined based on information configured for the first G-RNTI.

In another aspect of the present disclosure, there is provided a BS configured to perform the method.

According to an embodiment of the present disclosure, a multicast broadcast service (MBS) physical downlink control channel (PDCCH) and/or physical downlink shared channel (PDSCH) may be repeatedly transmitted, thereby not only providing a more robust and reliable MBS but also minimizing unnecessary physical uplink control channel (PUCCH) overhead caused by frequent transmission of hybrid automatic repeat request (HARD) feedback by multiple user equipments (UEs).

It will be appreciated by persons skilled in the art that the effects that could be achieved with the present disclosure are not limited to what has been particularly described hereinabove and other advantages of the present disclosure will be more clearly understood from the following detailed description.

DETAILED DESCRIPTION

Figure 1:
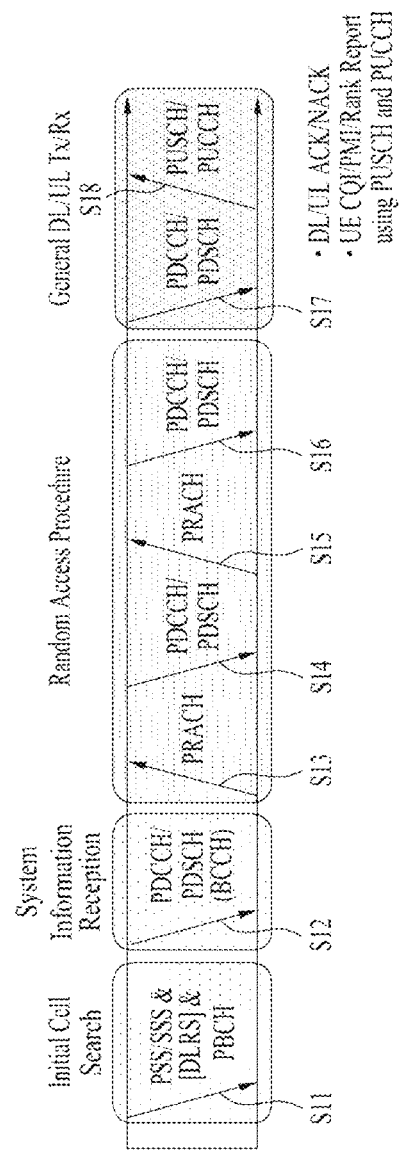
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/user equipments (UEs) sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in following documents.

3GPP LTE

TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
MBMS: Multimedia Broadcast/Multicast Service
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated with the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell
MBSFN Synchronization Area: (In the case of an LTE network), the term MBSFN Synchronization Area refers to a network area where all base stations are capable of being synchronized and performing MBSFN transmission. The MBSFN synchronization area may support one or more MBSFN areas. On a given frequency, an eNodeB may only belong to one MBSFN synchronization area. MBSFN synchronization areas are defined independently of MBMS service areas.

MBSFN Transmission or a transmission in MBSFN mode: The term MBSFN Transmission refers to a simultaneous broadcast technique in which multiple cells transmit the same waveform at the same time. An MBSFN transmission from multiple cells within an MBSFN area is considered a single transmission by a UE.

MBSFN Area: The MBSFN area consists of a group of cells within an MBSFN synchronization area, which cooperate for MBSFN. Except for reserved cells in the MBSFN area, all cells participate in the MBSFN Transmission and advertise their MBMSN availability. The UE only needs to consider a subset of configured MBSFN areas (i.e., services of interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
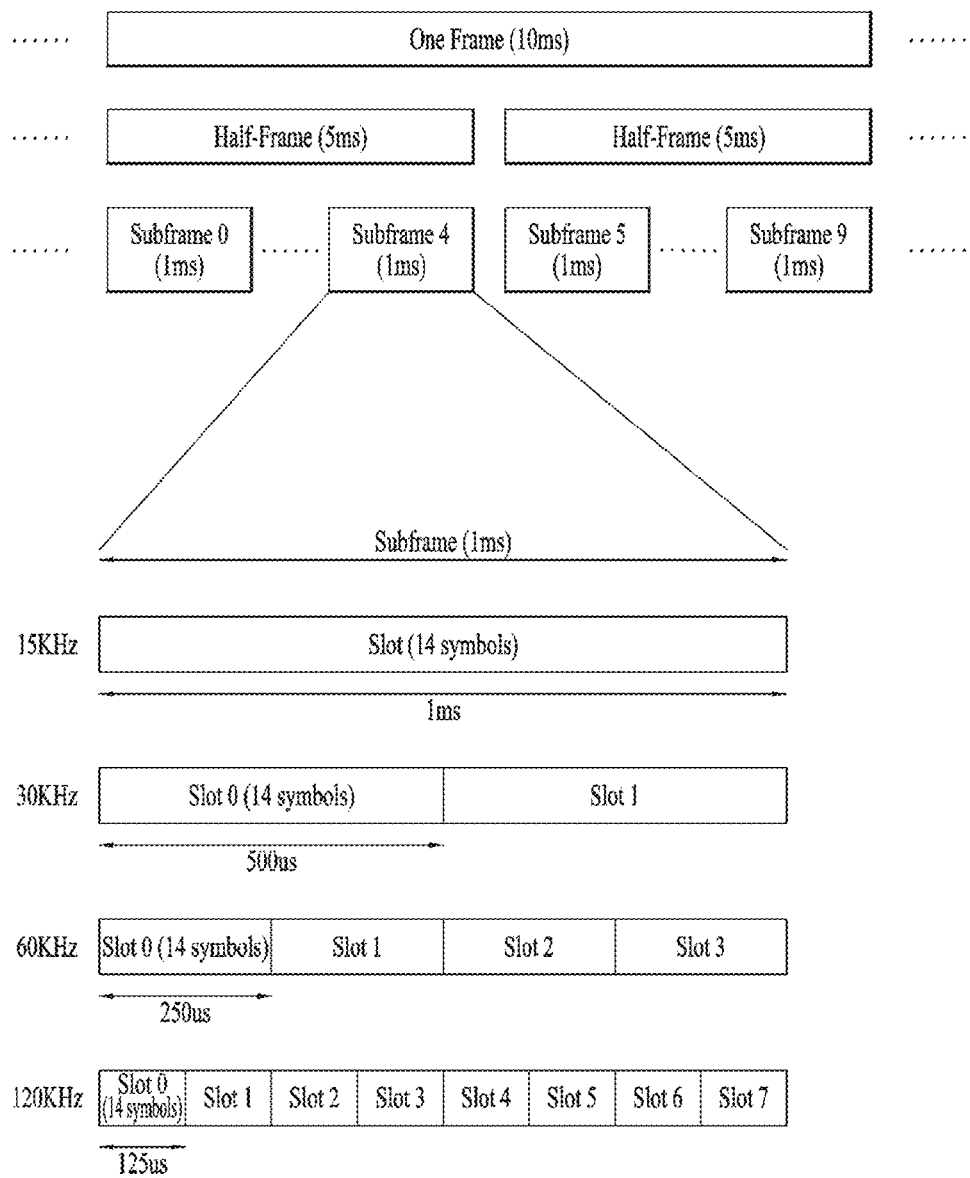
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
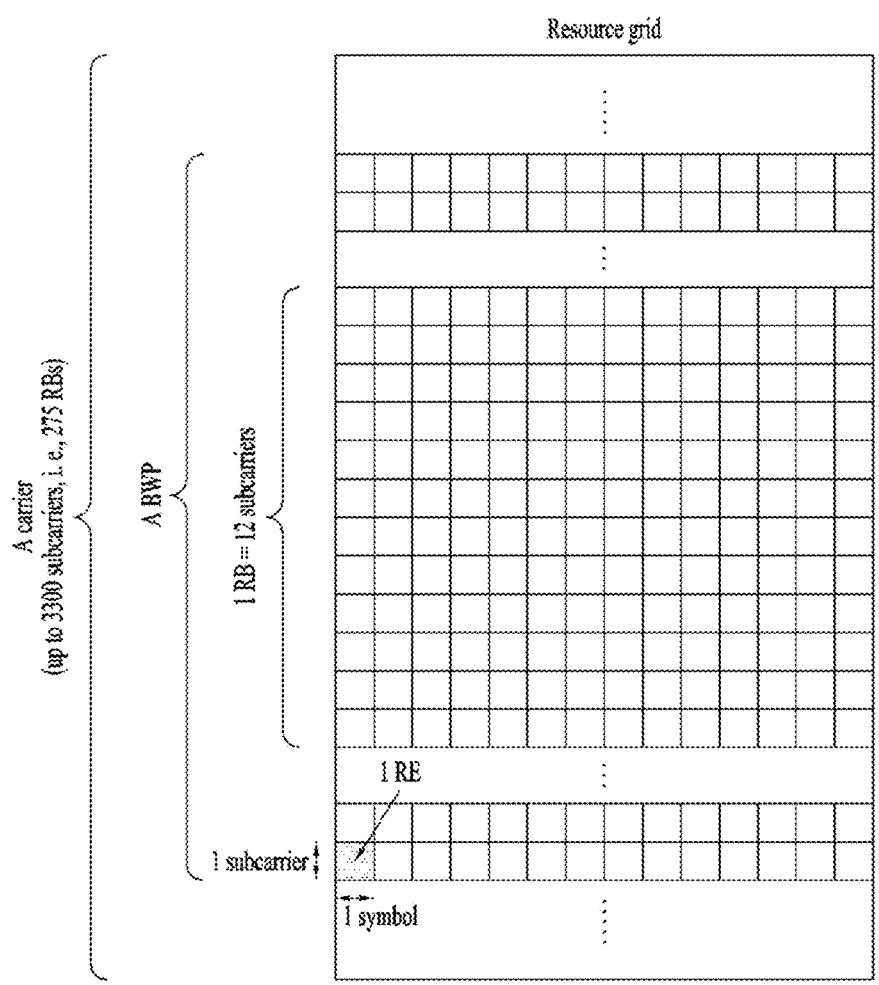
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
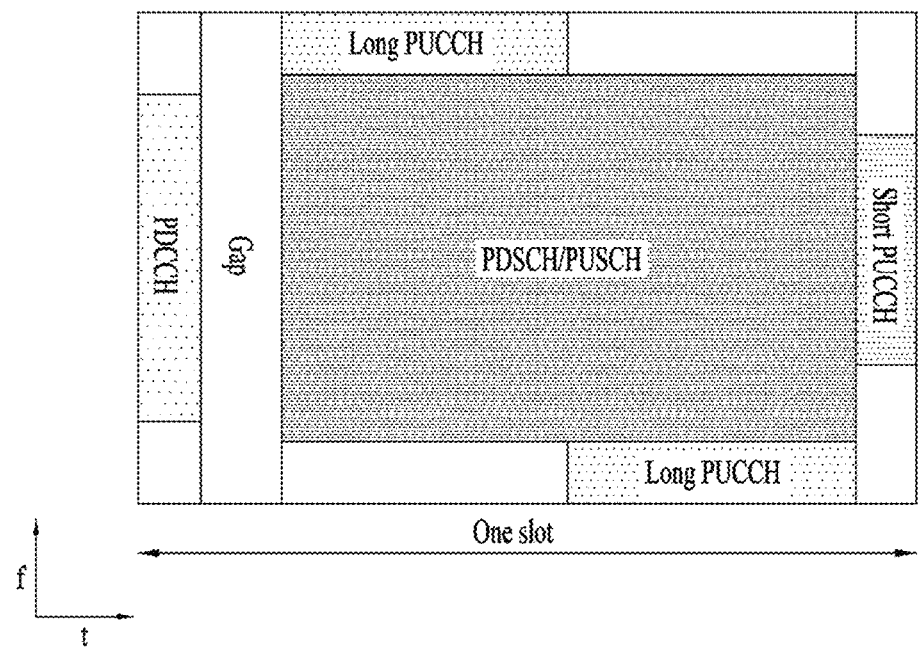
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

A BS may transmit a control resource set (CORESET) configuration to a UE. A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE. The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE, and the UE may monitor PDCCH candidates in one or more SSs to receive/detect the PDCCH. An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

PUSCH carries uplink data (e.g., UL-SCH transport block, UL-SCH TB) and/or uplink control information (UCI). PUCCH is transmitted based on a CP-OFDM (Cyclic Prefix-Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

Figure 5:
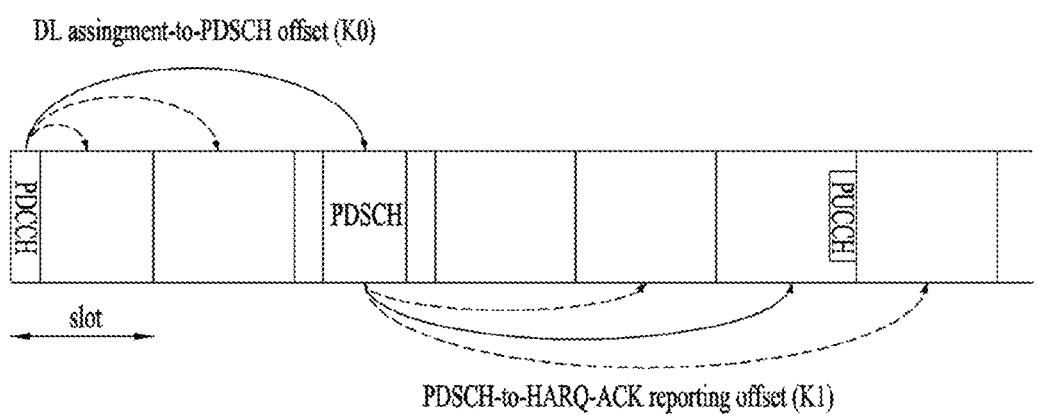
FIG. 5 illustrates an example of a physical downlink shared channel (PDSCH) transmission/reception procedure.

FIG. 5 illustrates an example of a PDSCH transmission/reception procedure. Referring to FIG. 5, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ_feedback timing indicator, which indicates K1 (e.g., slot offset)

HARQ process number (4 bits), which indicates the HARQ process ID (Identity) for data (e.g., PDSCH, TB)

PUCCH resource indicator (PRI): PRI indicates a PUCCH resource to be used for UCI transmission among a plurality of PUCCH resources in the PUCCH resource set The UE receives the PDSCH in slot #(n+K0) based on the scheduling information received in slot #n. After completion of the PDSCH reception in slot #n1 (where, n+K0≤n1), the UE may transmit UCI through PUCCH from slot #(n1+K1). Here, the UCI may include a HARQ-ACK response for the PDSCH. In FIG. 5, for convenience, it is assumed that the SCS for the PDSCH and the SCS for the PUCCH are the same, and it is assumed that slot #n1=slot #n+K0, but the present disclosure is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on ACK/NACK (A/N) bits for a plurality of TBs.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the BS, and when either TB is NACK, the UE reports the NACK bit value to the BS.

For example, when only a 1-TB is actually scheduled on a serving cell in which 2-TB reception is allowed, the UE may generate a single A/N bit by performing a logical AND operation on the A/N bit for the corresponding 1-TB and a bit value of 1. As a result, the UE may report the A/N bit for the corresponding 1-TB to the BS as it is.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Block) transmissions in the buffer, HARQ feedback for the MAC PDU in the buffer, and a current redundancy version. Each HARQ process is identified by a HARQ process ID.

Figure 6:
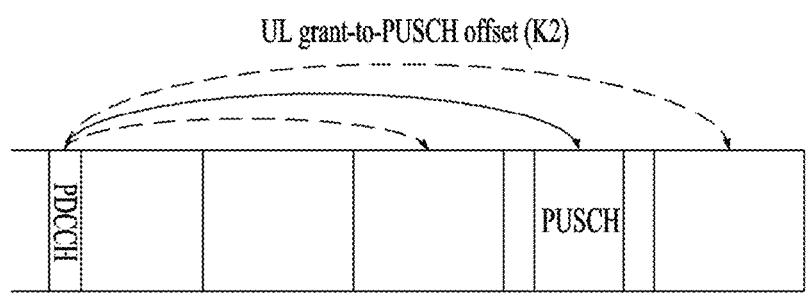
FIG. 6 illustrates an example of a physical uplink shared channel (PUSCH) transmission/reception procedure.

FIG. 6 illustrates an example of a PUSCH transmission/reception procedure. Referring to FIG. 6, the UE may detect the PDCCH in slot #n. Here, the PDCCH includes uplink scheduling information (e.g., DCI formats 0_0, 0_1). DCI formats 0_0 and 0_1 may include the following information:

Frequency domain resource assignment (FDRA), which indicates the RB set allocated to the PUSCH Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

The UE may transmit the PUSCH in slot #(n+K2) according to the scheduling information received in slot #n. The PUSCH may include a UL-SCH TB.

NR Beam Related Operation

Figure 7:
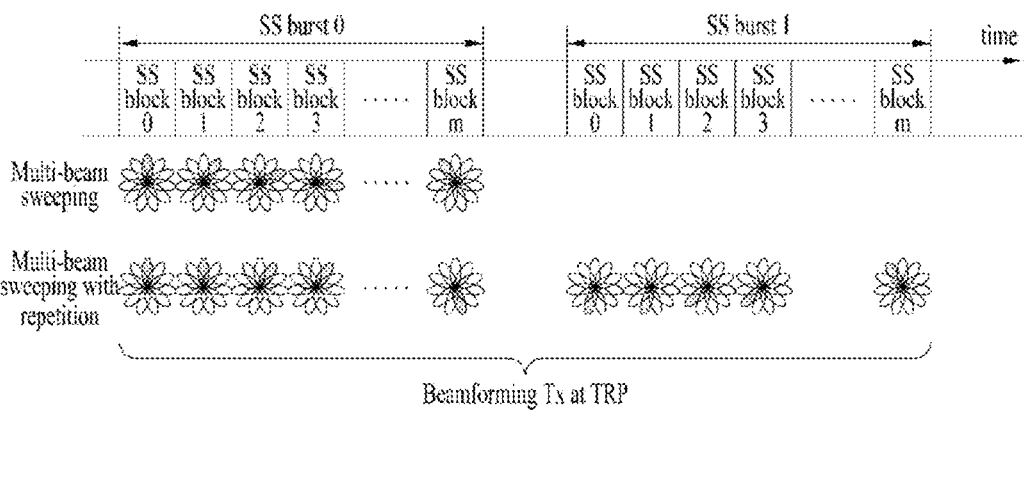
FIG. 7 is a diagram for explaining a new radio (NR) beam related operation.
Figure 7:
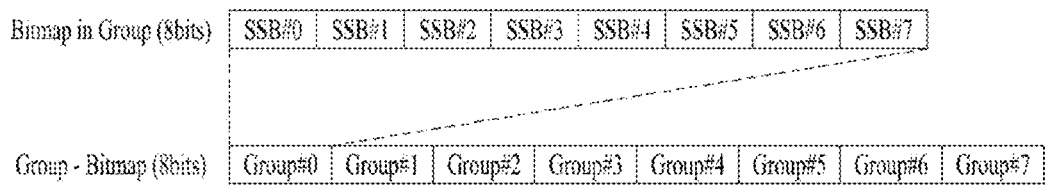

FIG. 7(a) illustrates multi-beam transmission in SSBs.

Beam sweeping refers to changing the beam (direction) of a radio signal over time by a transmission reception point (TRP) (e.g., BS/cell) (hereinafter, the terms beam and beam direction may be interchangeably used). SSBs may be transmitted periodically by beam sweeping. In this case, SSB indices are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of contiguous SSBs. The maximum number of times that the SSB is transmitted in an SSB burst set, L may have a value of 4, 8, or 64 depending on the frequency band of a carrier. Accordingly, the maximum number of SSB beams in the SSB burst set may be given according to the frequency band of the carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

When multi-beam transmission is not applied, the number of SSB beams is 1.

When the UE attempts to initially access the BS, the UE may align beams with the BS based on the SSB. For example, the UE identifies the best SSB after performing SSB detection. Thereafter, the UE may transmit a RACH preamble to the BS on a PRACH resource linked/corresponding to the index (i.e., beam) of the best SSB. The SSB may be used to align beams between the BS and UE after the initial access.

FIG. 7(b) illustrates a method of notifying an actually transmitted SSB (SSB_tx).

A maximum of L SSBs may be transmitted in an SSB burst set, and the number and positions of actually transmitted SSBs may vary for each BS/cell. The number and positions of actually transmitted SSBs may be used for rate-matching and measurement, and information about actually transmitted SSBs may be indicated as follows.

When the number and positions of actually transmitted SSBs are related to rate-matching, the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for frequency ranges below 6 GHz and a compressed bitmap for frequency ranges above 6 GHz. Specifically, the information about actually transmitted SSBs may be indicated by group-bitmap (8 bits)+intra-group bitmap (8 bits). Resources (e.g., REs) indicated by the UE-specific RRC signaling or RMSI may be reserved for SSB transmission, and a PDSCH/PUSCH may be rate-matched in consideration of the SSB resources.

When the number and positions of actually transmitted SSBs are related to measurement, the network (e.g., BS) may indicate an SSB set to be measured within a measurement period if the UE is in RRC connected mode. The SSB set may be indicated for each frequency layer. If no SSB set is indicated, a default SSB set may be used. The default SSB set includes all SSBs within the measurement period. The SSB set may be indicated by a full bitmap (e.g., of length L) of RRC signaling. When the UE is in the RRC idle mode, the default SSB set is used.

Hereinafter, a beam management (BM) procedure defined by New Radio (NR) will be described. The BM procedure refers to layer 1/layer 2 (L1/L2) procedures for acquiring and maintaining a set of BS (e.g., gNB, TRP, etc.) beams and/or a set of UE beams available for downlink (DL) and uplink (UL) transmission/reception. The BM procedure may include the following processes and terminology.

Beam measurement: an operation by which a BS or UE measures the characteristics of a received beamformed signal Beam determination: an operation by which a BS or UE selects its transmission/reception (Tx/Rx) beam Beam sweeping: an operation of covering a spatial domain by using Tx and/or Rx beams for a prescribed period of time according to a predetermined method Beam reporting: an operation by which a UE reports information regarding a beamformed signal based on the beam measurement For the beam measurement, an SSB (or SS/PBCH block) or a channel state information reference signal (CSI-RS) may be used in DL, and a sounding reference signal (SRS) may be used in UL. In RRC_CONNECTED mode, the UE may measure multiple beams (or at least one beam) of a cell and average the measurement results (e.g., reference signal received power (RSRP), reference signal received quality (RSRQ), signal-to-interference-plus-noise ratio (SINR), etc.) to derive the cell quality. In doing so, the UE may be configured to consider a subset of the detected beam(s).

In the beam measurement, filtering may be performed at two different levels (at the physical layer to derive beam quality and at the RRC level to derive cell quality from multiple beams). The cell quality is derived from beam measurements in the same way for serving cell(s) and non-serving cell(s).

If the UE is configured to report measurement results for specific beam(s) by the gNB, the measurement report may include measurement results for X best beams. The beam measurement results may be reported as L1-RSRP.

The BM procedure may be divided into: (1) a DL BM procedure based on an SS/PBCH block or CSI-RS; and (2) a UL BM procedure based on an SRS. In addition, each BM procedure may include Tx beam sweeping for determining Tx beam(s) and Rx beam sweeping for determining Rx beam(s). The DL BM procedure may include: (1) transmission of beamformed DL RSs (e.g., CSI-RS or SSB) by the BS; and beam reporting by the UE. Here, the beam reporting may include preferred DL RS identifier(s) (ID(s)) and L1-RSRP thereof. The DL RS ID may be an SSB resource indicator (SSBRI) or a CSI-RS resource indicator (CRI).

An SSB beam and a CSI-RS beam may be used for beam measurement. The measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping based on the SSB may be performed as follows: the UE changes Rx beams for the same SSBRI across multiple SSB bursts. Here, one SS burst may include one or more SSBs, and one SS burst set may include one or more SSB bursts.

The configuration of a beam report based on the SSB may be performed when CSI/beams are configured in the RRC_CONNECTED state (or RRC_CONNECTED mode). As in the CSI-ResourceConfig information element (IE) of Table 5 below, the SSB may be set as a CSI-RS resource instead of separately defining a BM configuration based on the SSB. Table 5 shows an example of the CSI-ResourceConfig IE.

TABLE 5

```
-- ASN1START
-- TAG-CSI-RESOURCECONFIG-START
CSI-ResourceConfig ::=     SEQUENCE {
    csi-ResourceConfigId     CSI-ResourceConfigId,
```

TABLE 5-continued

```
csi-RS-ResourceSetList        CHOICE {
   nzp-CSI-RS-SSB                      SEQUENCE {
      nzp-CSI-RS-ResourceSetList SEQUENCE (SIZE (1..maxNrofNZP-CSI-RS-
ResourceSetsPerConfig)) OF NZP-CSI-RS-ResourceSetId OPTIONAL,
      csi-SSB-ResourceSetList             SEQUENCE (SIZE (1..maxNrofCSI-
SSB-ResourceSetsPerConfig)) OF CSI-SSB-ResourceSetId OPTIONAL
   },
   csi-IM-ResourceSetList         SEQUENCE (SIZE (1..maxNrofCSI-IM-
ResourceSetsPerConfig)) OF CSI-IM-ResourceSetId
   },
   bwp-Id                       BWP-Id,
   resourceType                 ENUMERATED { aperiodic, semiPersistent, periodic },
   ...
}
-- TAG-CSI-RESOURCECONFIGTOADDMOD-STOP
-- ASN1STOP
```

In Table 5, the parameter csi-SSB-ResourceSetList indicates a list of SSB resources used for beam management and reporting in one resource set. The UE receives a CSI-ResourceConfig IE including csi-SSB-ResourceSetList including SSB resources used for BM from the BS (S410).

In this case, the SSB resource set may be set to {SSBx1, SSBx2, SSBx3, SSBx4, . . . }, and SSB indices may be defined from 0 to 63. The UE may receive the SSB resources from the BS based on csi-SSB-ResourceSetList (S420). When CSI-RS reportConfig related to SSBRI and RSRP reporting is configured, the UE may report (beams with) the best SSBRI and RSRP related thereto to the BS (S1130). That is, if reportQuantity of the CSI-RS reportConfig IE is set to 'ssb-Index-RSRP', the UE may report the best SSBRI and RSRP related thereto to the BS. If a CSI-RS resource is configured in the same OFDM symbol(s) as the SSB (or SS/PBCH Block) and if 'QCL-TypeD' is applicable, the UE may assume that the CSI-RS and SSB are quasi co-located (QCLed) in terms of 'QCL-TypeD'. Here, QCL-TypeD may mean that antenna ports are QCLed in terms of spatial Rx parameters. When the UE perform reception on a plurality of DL antenna ports in the QCL-TypeD relationship, the UE may apply the same Rx beam. In addition, the UE may not expect that the CSI-RS will be configured in REs overlapping with those of the SSB.

The UE may receive a list of up to M candidate transmission configuration indication (TCI) states at least for the purpose of QCL indication through RRC signaling. Here, M may be 64. Each TCI state may be configured as one RS set.

The ID of a DL RS for the purpose of spatial QCL (QCL Type D) at least in an RS set may refer to one of the following DL RS types: SSB, P-CSI RS, SP-CSI RS, and A-CSI RS. The initialization/update of the IDs of DL RS(s) in the RS set used at least for the purpose of spatial QCL may be performed at least by explicit signaling.

Quasi-Co Location (QCL)

An antenna port may be defined such that a channel that carries a symbol on the antenna port is inferred from a channel that carries another symbol on the same antenna port. When the properties of a channel carrying a symbol on an antenna port are inferred from a channel carrying a symbol on another antenna port, the two antenna ports may be said to be in the quasi co-located or quasi co-location (QC/QCL) relationship.

The channel properties may include at least one of the following factors: delay spread, Doppler spread, frequency shift, average received power, and received timing, or spatial receive (RX) parameter. Here, the spatial Rx parameter refers to a spatial (RX) channel property parameter such as angle of arrival.

In order for the UE to decode a PDSCH based on a detected PDCCH with DCI intended for the corresponding UE and a given serving cell, a list of up to M TCI-state configurations may be configured by the higher layer parameter PDSCH-Config, where M depends on UE capability.

Each TCI-state includes parameters for establishing a QCL relationship between one or two DL RSs and DMRS ports of the PDSCH. The QCL relationship is configured by the higher layer parameter qcl-Type1 for a first DL RS and the higher layer parameter qcl-Type2 for a second DL RS (if configured). For the two DL RSs, the QCL types may not be the same, regardless of whether the RSs are the same DL RS or different DL RSs. The QCL type of each DL RS is given by a parameter 'qcl-Type' in QCL-Info and have one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if the target antenna port is a specific non-zero power (NZP) CSI-RS, corresponding NZP CSI-RS antenna ports may be indicated/configured to be QCL with a specific tracking reference signal (TRS) in terms of QCL-Type A and QCL with a specific SSB in terms of QCL-Type D. Upon receiving the above indication/configuration, the UE may receive the corresponding NZP CSI-RS based on Doppler and delay values measured on the QCL-TypeA TRS and apply a reception beam used to receive the QCL-TypeD SSB to the reception of the corresponding NZP CSI-RS. The UE may receive an activation command used to map up to 8 TCI states to the code point of the DCI field 'Transmission Configuration Indication' through medium access control (MAC) control element (CE) signaling.

Multimedia Broadcast/Multicast Service (MBMS)

Hereinafter, MBMS schemes used in 3GPP LTE will be described. 3GPP MBMS may be classified as (i) a single frequency network (SFN) scheme in which a plurality of BS cells are synchronized to transmit the same date on a PMCH, and (ii) a single cell point to multipoint (SC-PTM) scheme in which broadcasting is performed over a PDCCH/PDSCH in the coverage of a corresponding cell. The SFN scheme is used to provide broadcast services over a wide area (e.g., MBMS area) on semi-statically pre-allocated resource(s), whereas the SC-PTM scheme is used to provide broadcast services within a cell coverage on dynamic resource(s).

SC-PTM provides one logical channel, i.e., a single cell multicast control channel (SC-MCCH) and one or more logical channels, i.e., one or more single cell multicast traffic channels (SC-MTCHs). The logical channels are mapped to a transport channel, a DL-SCH, and a physical channel, a PDSCH. The PDSCH carrying SC-MCCH data or SC-MTCH data is scheduled by a PDCCH scrambled with a group RNTI (G-RNTI). In this case, a temporary mobile group identity (TMGI) corresponding to a service ID may be one-to-one mapped to a specific G-RNTI value. Thus, if the BS provides a plurality of services, a plurality of G-RNTI values may be allocated for SC-PTM transmission. One or more UEs may perform PDCCH monitoring based on a specific G-RNTI to receive a specific service. For the specific service/G-RNTI, an SC-PTM dedicated DRX on-duration may be configured. In this case, the UEs may wake up for specific on-duration(s) and perform the PDCCH monitoring based on the G-RNTI.

PDCCH/PDSCH Repetition for Multicast/Broadcast Service (MBS)

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

In NR, the UE supports DL reception based on beamforming. The UE receives a DL signal on a specific beam among a plurality of candidate beams. In particular, when the UE is in connected mode, the BS and UE may maintain an optimal beam for the UE through a BM process. Accordingly, the BS may transmit a PDCCH/PDSCH on an optimal TX beam suitable for the UE, and the UE may receive the PDCCH/PDSCH on an optimal RX beam.

REL-17 NR intends to introduce a DL broadcast or DL multicast transmission method to support multicast/broadcast service (MBS) services. In a point-to-multipoint (PTM) transmission method such as MBS, one DL broadcast/multicast transmission is received by multiple UEs, and thus the PTM transmission method has an advantage of saving radio resources, compared to when a DL unicast transmission is transmitted to each UE (e.g., point-to-point transmission).

NR supports UL feedback (e.g., HARQ) for MBS transmission to support MBS retransmission. However, when there are many UEs receiving the same TB, it may be efficient that the BS repeatedly transmits (or retransmits) the same TB with no UL feedback.

Accordingly, the present disclosure proposes an MBS scheduling method for repeated transmission of an MBS related PDCCH/PDSCH (regardless of UL feedback).

An MBS BWP may be referred to as a "common frequency resource (CFR)", and the CFR may be configured only for DL as described above. In this case, a HARQ-ACK (or NACK only) may be transmitted in a (unicast) active UL BWP. HARQ feedback may correspond to an A/N report or a NACK only report depending on higher layer configurations. For example, when the NACK only scheme is configured, the UE may transmit HARQ feedback if the UE fails to receive a related MBS. On the contrary, the UE may drop ACK transmission if the UE correctly receives the MBS. When the A/N reporting scheme is configured, the UE may report a HARQ-ACK response in both cases of an ACK and a NACK. A CFR for the MBS may provide the same MBS to one or more UEs. For example, when CFR_A is associated with BWP 1 of UE 1 (for example, CFR_A is configured in BWP 1) and CFR_B is associated with BWP 2 of UE 1 (for example, CFR_B is configured in BWP 2), CFR_A may be additionally configured for BWP 2 of UE 2 and BWP 3 of UE 3, and CFR_B may be additionally configured for BWP 3 of UE 2 and BWP 4 of UE 4. Accordingly, CFR_A may be a CFR for UEs 1, 2, and 3, and CFR_B may be a CFR for UEs 1, 2, and 4. For example, it is assumed that the current active BWP of UE 1 is BWP 1 and UE 1 is receiving an MBS on CFR_A associated with BWP 1 of UE 1. In this case, if UE 1 is instructed by DCI to switch to BWP 2, UE 1 may activate BWP 2 (which is inactive) and start MBS reception on CFR_B associated with the new active BWP. When BWP switching is completed, UE 1 may deactivate BWP 1 and no longer receive CFR_A.

The BS may provide an MBS related search space set (hereinafter referred to as an MSS). The MSS may be defined as a new type of CSS, a USS, or a new SS that is neither a CSS nor a USS. Herein, an SS set may be simply referred to as an SS. For example, a USS set may be referred to as a USS, and a CSS set may be referred to as a CSS.

One MSS set, which is configured by the BS, may be configured/defined as follows:

At least one MBS channel may be associated with one MSS set. For example, at least one MCCH or MTCH may be associated with one MSS set.

An MBS control information message or MBS SIB may be associated with one MSS set.

At least one MBS service may be associated with one MSS set. For example, at least one MBS service ID (e.g., TMGI) may be associated with one MSS set.

At least one RNTI value may be associated with one MSS set. For example, at least one G-RNTI may be associated with one MSS set. Alternatively, at least one SC-RNTI may be associated with one MSS set.

When the BS performs multicast/broadcast transmission based on beamforming, the BS may configure one G-RNTI, one MBS service, or one MCCH/MTCH to be associated with a plurality of CORSETs/MSS sets. For example, the BS may associate one SSB or one CSI-RS resource set with one CORSET/MSS set. In addition, CORSETs/MSS sets less than or equal to the total number of SSBs or CSI-RS resource sets provided by the BS may be associated with one G-RNTI, one MBS service, or one MCCH/MTCH.

Alternatively, the BS may associate one SSB or one CSI-RS resource set with a plurality of CORSETs/MSS sets. Alternatively, the BS may associate a plurality of SSBs or a plurality of CSI-RS resource sets to one CORSET/MSS set.

To broadcast MBS services on a cell, the BS managing the corresponding cell may transmit SIB1, an MBS SIB, at least one MCCH, and/or at least one MTCH. The MCCH and MTCH, each corresponding to a logical channel, may be transmitted on a PDSCH, which is a physical channel, and scheduled by a PDCCH. The MCCH may carry MBS control information, and the MTCH may carry MBS data.

The BS may provide UEs with a BWP for the MBS (e.g., an MBS BWP). The MBS BWP may include at least one of an MBS SIB DL/UL BWP for MBS SIB transmission/reception, an MCCH DL/UL BWP for MCCH transmission/reception, or an MTCH DL/UL BWP for MTCH transmission/reception. One cell may provide zero or one or more MBS DL BWPs and/or zero or one or more MBS UL BWPs. Therefore, if the BS supports the MBS, the BS may provide all MBS BWP types (independently of conventional initial BWPs or UE-dedicated BWPs). Alternatively, the BS may provide zero or some MBS BWPs. Some or all of the MBS BWPs may be the same as or different from the conventional initial BWP, default BWP, first active BWP, or active BWP.

For example, the BS may transmit the MBS SIB and SIB1 in an initial DL BWP and transmit the PDCCH/PDSCH for the MCCH and MTCH in the initial DL BWP or a separate DL BWP (hereinafter such a DL BWP is referred to as an MBS DL BWP). Alternatively, the BS may transmit the MBS SIB in an MBS SIB DL BWP. In addition, the BS may separately configure an MBS SIB UL BWP to allow the UE to request the MBS SIB on demand.

The MBS SIB may include configuration information regarding an MCCH DL/UL BWP for at least one MCCH and configuration information regarding a PDCCH MSS set for MCCH transmission. In addition, the MBS SIB or MBS control information may include configuration information regarding an MTCH DL/UL BWP for at least one MTCH and configuration information regarding a PDCCH MSS set for MTCH transmission.

Configuration information regarding an MBS BWP may include information regarding the frequency location, bandwidth size, and SCS of the corresponding BWP. The MBS BWP may be included in the same cell as the initial BWP or may be included in a different cell (hereinafter referred to as an MBS SCell). When the UE desires to receive MBS services, the UE may receive a PDCCH/PDSCH for transmitting MCCH/MTCH data by configuring the MBS BWP and MBS Scell, regardless of the RRC state of the UE. Meanwhile, the BS may transmit MBS control information to a UE in the connected state (hereinafter referred to as a connected UE) through UE-dedicated signaling.

It is assumed that the UE is capable of applying (analog) beamforming to DL reception. For example, it is assumed that the UE may receive a DL signal on a specific beam among a plurality of candidate beams. Information for the UE to determine the reception beam for a PDSCH carrying one MBS TB (e.g., one MCCH TB composed of at least one piece of MCCH data or one MTCH TB composed of at least one piece of MTCH channel data) may be information regarding an MBS RS that is quasi co-located (QCL) in terms of spatial Rx parameters (i.e., QCL source for Type D).

When the UE is in idle/inactive mode (hereinafter referred to as idle/inactive UE), the UE may determine the quality of a cell by measuring the SSB of the corresponding cell. If the UE discovers a plurality of cells, the UE may select a cell with the highest quality (e.g., the highest RSRP measurement value) from among the cells. The UE may camp on the cell by receiving an MIB and SIB1 from the selected cell. Then, the UE may receive other SI messages. In summary, the idle/inactive UE may use the SSB as an MBS RS to determine the optimal beam for MBS reception in the corresponding cell.

When the UE is in connected mode (hereinafter referred to as a connected mode UE), the UE may perform BM. Accordingly, the BS and UE may know and manage the optimal beam for the corresponding UE. In this case, the TCI state of the UE selected by the current BM operation may be applied not only to unicast PDSCH reception but also to broadcast/multicast PDSCH (MBS PDSCH) reception, depending on the MBS transmission method of the BS. The BS may indicate through system information, an MCCH, or UE-dedicated signaling that the UE or the MBS UE in the cell is allowed to use the optimal TCI state selected by the current BM operation for MBS TB reception.

However, the TCI state determined based on the best SSB index of the serving cell or the TCI state determined by the BM of the connected UE may not be suitable for MBS reception, depending on the MBS transmission method of the BS. In this case, the BS may provide a separate MBS RS for the MBS. For example, when the BS configures a separate MBS BWP, the BS may configure SSB resources for the MBS (e.g., MBS-dedicated SSB resources) or CSI-RS resources in the corresponding MBS BWP or in the vicinity of the frequency thereof for idle/inactive/connected UEs receiving the MBS in the corresponding MBS BWP.

Accordingly, the BS may indicate as an MBS related RS (hereinafter referred to as an MBS RS) at least one of the following RSs through system information (SIB1 or MBS SIB), MBS control information, or UE-dedicated signaling.

Cell-defining SSB resources of the serving cell (e.g., PCell, PSCell, SCell, etc.)

SSB resources or CSI-RS resources configured in the active BWP

SSB resources or CSI-RS resources configured in the default BWP

SSB resources or CSI-RS resources configured in the configured BWP

SSB resources or CSI-RS resources configured in the MBS BWP

The MBS RS indicated by the BS may be associated with at least one MBS BWP, at least one MCCH reception, at least one MTCH reception, at least one MBS service reception, and/or at least one G-RNTI based transmission.

Figure 8:
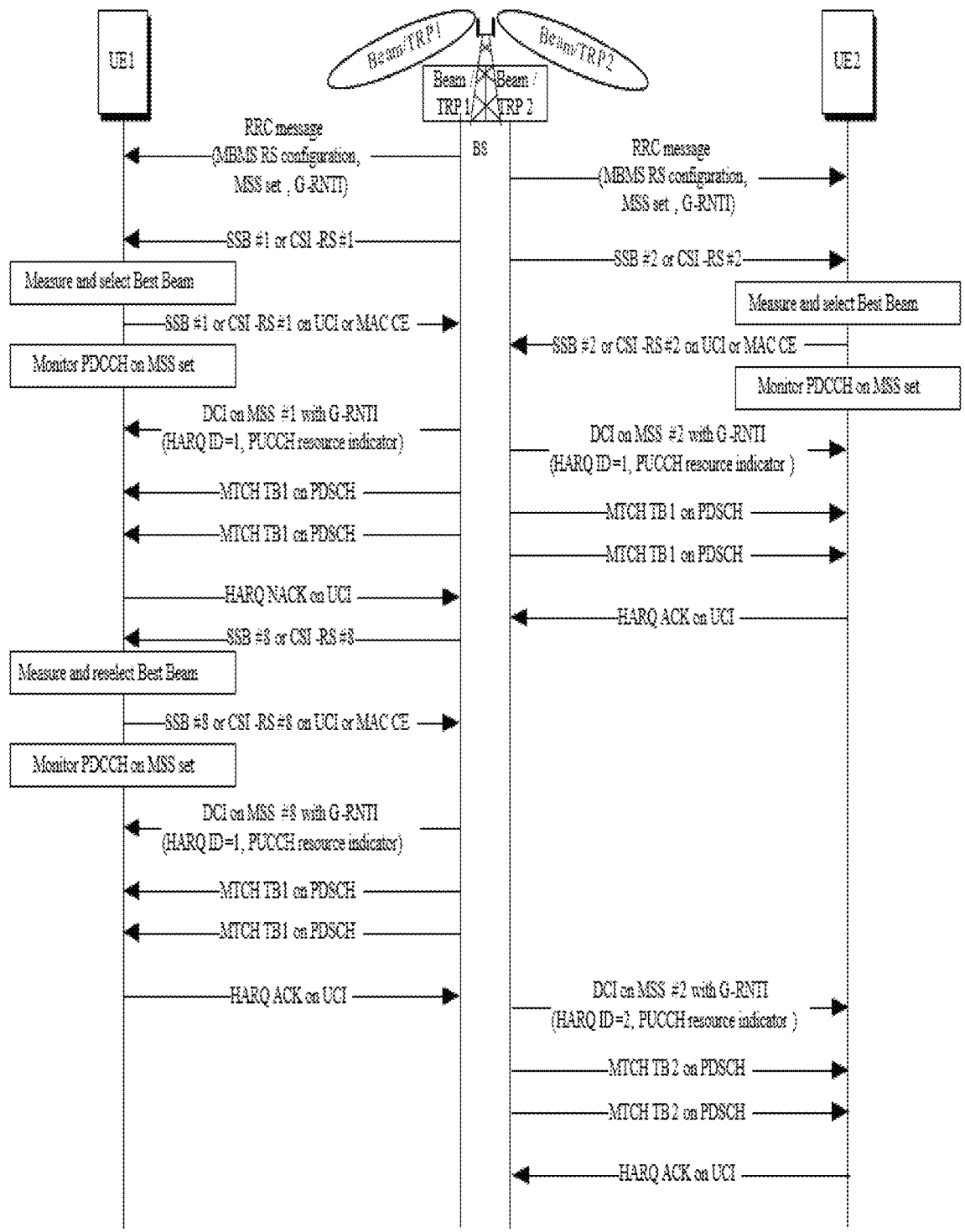
FIG. 8 illustrates broadcast or multicast transmission based on beam reference signals (RSs) according to an embodiment of the present disclosure.

FIG. 8 illustrates broadcast or multicast transmission based on beam RSs according to an embodiment of the present disclosure.

Referring to FIG. 8, UE 2 may receive initial transmission and retransmission of MTCH TB 1 in the same TCI state (e.g., same TRP/beam). Meanwhile, UE 1 may change the TCI state (e.g., optimal TRP/beam) based on SSB or CSI-RS measurement before retransmission. For example, when the quality of SSB #1 or CSI-RS #1 falls below a threshold and when the quality of SSB #8 or CSI-RS #8 is above the threshold or the quality of SSB #8 or CSI-RS #8 is the highest, the UE may report SSB #8 or CSI-RS #8 to the BS. If the TCI state is capable of being changed between the initial transmission and retransmission of MTCH TB 1, it is possible to receive the initial transmission and retransmission of the same MTCH TB, MTCH TB 1 in different TCI states, that is, from/on different TRPs/beams.

DCI 1 and DCI 2 may schedule PDSCH data transmissions transmitted from/on different TRPs/beams. The UE may report HARQ feedback (e.g., ACK or NACK) according to the decoding result of MTCH TB 1 received over a PDSCH. The BS may allocate PUCCH resources in DCI 1 and DCI 2. If UE 1 reports a NACK and UE 2 reports an ACK, the BS may retransmit MTCH TB 1 with only the TCI state of UE 1. That is, PDCCH/PDSCH transmission may be performed only with a TRP/beam corresponding to the TCI state. For example, in FIG. 2-1 (FIG. 8?), UE 1 may monitor a PDCCH occasion in a CORSET/MSS set of TCI state 8. UE 1 may receive DCI having a CRC scrambled with a G-RNTI over a PDCCH and then obtain MTCH TB 1 after receiving a PDSCH based on the DCI.

On the other hand, UE 2 may monitor a PDCCH occasion in a CORSET/MSS set of TCI state 2. UE 2 may receive DCI having a CRC scrambled with another G-RNTI and then obtain MTCH TB 2 after receiving a PDSCH based on the DCI.

Transmission of UE-Dedicated/UE-Group PDSCH Based on DCI

When a plurality of UEs desire to receive the same data, the BS may configure a point-to-point (PTP) bearer for transmitting the same data to different UEs for each UE and configure/transmit a UE-dedicated TB to each UE. Alternatively, the BS may configure/transmit a UE-group TB to each of a plurality of UE groups by configuring a PTM bearer for transmitting the same data to the plurality of UEs at once. In this case, the UE-group TB and the UE-dedicated TB may not be combined with each other.

A plurality of PDSCHs where N-th HARQ transmission of the same TB is performed for the same HARQ process ID may be configured as one MBS PDSCH set. For example, in FIG. 8, different PDSCHs for the same TB received by UE 1 and UE 2 are transmitted with different RSs or different TCI states, and these PDSCHs may be configured as one MBS PDSCH set. In the MBS PDSCH set, each PDSCH transmission where the N-th HARQ transmission is performed for the same HARQ process ID may be scheduled by at least one DCI. For example, when the CRC of the DCI is scrambled with a G-RNTI, the corresponding DCI may indicate N-th TB transmission to a plurality of UEs. In addition, when the CRC of the DCI is scrambled with a C-RNTI, the corresponding DCI may indicate N-th TB transmission to a specific UE. In the case of the C-RNTI, PDSCH resources in the PDSCH set may be for UE-dedicated PDSCH transmission or UE-group PDSCH transmission shared by a plurality of UEs, depending on the contents of the DCI. Meanwhile, HARQ A/N for the data for a G-RNTI. The UE-group MBS PDSCH may be transmission for a specific G-RNTI. The BS may transmit the DCI to a specific UE receiving the MBS PDSCH based on the C-RNTI of the specific UE and schedule the MBS PDSCH in the corresponding DCI. The UE may determine the G-RNTI of the UE-group MBS PDSCH based on an MCCH message, a UE-dedicated RRC message, or a DCI field. In Method 2-2, the DCI may be transmitted/received over a CSS PDCCH, MSS PDCCH, or USS PDCCH.

When the DCI schedules the UE-group MBS PDSCH, the UE may receive the PDSCH by generating a scrambling code of the PDSCH as shown in Table 6 below. Parameters for initializing a scrambling sequence generator for the PDSCH may be RRC parameters configured by the BS. The parameters for initializing the scrambling sequence generator may be configured for each cell in which the MBS PDSCH is transmitted, or the parameters may be configured for each BWP or G-RNTI associated with the UE-group MBS PDSCH. Herein, $n_{RNTI}$ corresponds to the G-RNTI.

TABLE 6

Up to two codewords q ∈ {0, 1} can be transmitted. In case of single-codeword transmission, q = 0.
For each codeword q, the UE shall assume the block of bits $b^{(q)}(0), \ldots, b^{(q)}(M_{bit}^{(q)} - 1)$, where $M_{bit}^{(q)}$ is the number of bits in codeword q transmitted on the physical channel, are scrambled prior to modulation, resulting in a block of scrambled bits $\tilde{b}^{(q)}(0), \ldots, \tilde{b}^{(q)}(M_{bit}^{(q)} - 1)$ according to
$\tilde{b}^{(q)}(i) = (b^{(q)}(i) + c^{(q)}(i)) \bmod 2$
where the scrambling sequence $c^{(q)}(i)$ is given by clause 5.2.1. The scrambling sequence generator shall be initialized with
$c_{init} = n_{RNTI} \cdot 2^{15} + q \cdot 2^{14} + n_{ID}$
where
$n_{ID} \in \{0, 1, \ldots, 1023\}$ equals the higher-layer parameter dataScramblingIdentityPDSCH if configured and the RNTI equals the associated G-RNTI, and the transmission is not scheduled using DCI format 1_0 in a common search space;
$n_{ID} \in \{0, 1, \ldots, 1023\}$ equals
the higher-layer parameter dataScramblingIdentityPDSCH if the codeword is scheduled using a CORESET with CORESETPoolIndex equal to 0;
the higher-layer parameter AdditionaldataScramblingIdentityPDSCH if the codeword is scheduled using a CORESET with CORESETPoolIndex equal to 1;
if the higher-layer parameters dataScramblingIdentityPDSCH and AdditionaldataScramblingIdentityPDSCH are configured together with the higher-layer parameter CORESETPoolIndex containing two different values, and the RNTI equals the associated G-RNTI, and the transmission is not scheduled using DCI format 1_0 in a common search space;
$n_{ID} = N_{ID}^{cell}$ otherwise
and where $n_{RNTI}$ corresponds to the G-RNTI associated with the PDSCH transmission as described in clause 5.1 of [6, TS 38.214].

PDSCH transmission may be transmitted on a UE-dedicated PUCCH resource or a UE-group PUCCH resource shared by a plurality of UEs.
  1) Method 2-1: The CRC of DCI may be scrambled with a G-RNTI, and a UE-group MBS TB may be transmitted/retransmitted on a UE-group MBS PDSCH.
  2) Method 2-2: The CRC of DCI may be scrambled with a C-RNTI, and an MBS TB may be transmitted/retransmitted on a UE-group MBS PDSCH. In this case, the MBS TB may be configured with PTM bearer When the DCI schedules the UE-group MBS PDSCH, the UE may receive the PDSCH by generating a DMRS of the PDSCH as shown in Table 7 below. Parameters for initializing a pseudo-random sequence generator may be RRC parameters configured by the BS. The parameters for initializing the pseudo-random sequence generator may be configured for each cell in which the MBS PDSCH is transmitted, or the parameters may be configured for each BWP or G-RNTI associated with the UE-group MBS PDSCH. Herein, $n_{RNTI}$ corresponds to the G-RNTI.

TABLE 7

The UE shall assume the sequence r(n) defined by $$r(n) = \frac{1}{\sqrt{2}}(1 - 2 \cdot c(2n)) + j\frac{1}{\sqrt{2}}(1 - 2 \cdot c(2n + 1)),$$

where the pseudo-random sequence c(i) is defined in clause 5.2.1 The pseudo-random sequence generator shall be initialized with $$c_{init} = \left(2^{17}\left(N_{symb}^{slot}n_{s,f}^{\mu} + l + 1\right)\left(2N_{ID}^{\tilde{n}_{SCID}^{\tilde{\lambda}}} + 1\right) + 2^{17}\left\lfloor\frac{\tilde{\lambda}}{2}\right\rfloor + 2N_{ID}^{\tilde{n}_{SCID}^{\tilde{\lambda}}} + \tilde{n}_{SCID}^{\tilde{\lambda}}\right)\bmod 2^{21}$$

TABLE 7-continued where l is the OFDM symbol number within the slot, $n_{s,f}^\mu$ is the slot number within a frame, and
$N_{ID}^0, N_{ID}^1 \in \{0, 1, \ldots, 65535\}$ are given by the higher-layer parameters scramblingID0 and
scramblingID1, respectively, in the DMRS-DownlinkConfig IE if provided and the PDSCH is
scheduled by PDCCH using DCI format 1_1 or 1_2 with the CRC scrambled by the associated G-RNTI
$NID^0 \in \{0, 1, \ldots, 65535\}$ is given by the higher-layer parameter scramblingID0 in the DMRS-
DownlinkConfig IE if provided and the PDSCH is scheduled by PDCCH using DCI format
1_0 with the CRC scrambled by the associated G-RNTI;

$$N_{ID}^{\tilde{n}_{SCID}^{\tilde{\lambda}}} = N_{ID}^{cell} \text{ otherwise;}$$

$\tilde{n}_{SCID}^{\tilde{\lambda}}$ and $\tilde{\lambda}$ are given by
 if the higher layer parameter dmrsDownlink-r16 in the DMRS-DownlinkConfig IE is provided $$\tilde{n}_{SCID}^{\tilde{\lambda}} = \begin{cases} n_{SCID} & \lambda = 0 \text{ or } \lambda = 2 \\ 1 - n_{SCID} & \lambda = 1 \end{cases}$$

$$\tilde{\lambda} = \lambda$$

where λ is the CDM group defined in clause 7.4.1.1.2.
otherwise by $$\tilde{n}_{SCID}^{\tilde{\lambda}} = n_{SCID}$$
$$\lambda = 0$$

The quanity $n_{SCID} \in \{0, 1\}$ is given by the DM-RS sequence initialization field, if present, in the DCI
associated with the PDSCH transmission if DCI format 1_1 or 1_2 in [4, TS 38.212] is used, otherwise
$n_{SCID} = 0$.

i. The UE may receive N-th HARQ transmission of a specific TB over the PDSCH of Method 2-1/2-3 and receive (N+1)-th HARQ transmission of the same specific TB over the PDSCH of Method 2-2. In this case, DCIs according to different methods may indicate the same HARQ process ID. The DCI of Method 2-2 may indicate that the N-th HARQ transmission and the (N+1)-th HARQ transmission are capable of being combined. According to this indication, the UE may combine the N-th HARQ transmission and the (N+1)-th HARQ transmission. In this case, the DCI field of Method 2-2 may indicate the G-RNTI related to the PDSCH of the N-th HARQ transmission.

ii. The DCI field of Method 2-2 may indicate a plurality of G-RNTIs, and in this case, transmission of a plurality of UE-group MBS PDSCHs related to the plurality of indicated G-RNTIs may be scheduled. Accordingly, the UE may receive multiple TBs for multiple G-RNTIs with one DCI.

iii. If the DCI field of Method 2-2 indicates a cell index or a BWP ID, the UE may receive the UE-group MBS PDSCH from a cell indicated by the corresponding cell index or from a BWP indicated by the corresponding BWP ID.

3) Method 2-3: When the CRC of DCI is scrambled with a C-RNTI and when a UE-dedicated MBS PDSCH is transmitted/retransmitted, the DCI may indicate a UE-dedicated PUCCH resource or UE-group PUCCH resource for HARQ feedback transmission.

The UE may receive N-th HARQ transmission of a specific TB on the PDSCH of Method 2-1/2-2 and receive (N+1)-th HARQ transmission of the same specific TB on the PDSCH of Method 2-3. In this case, DCIs according to different methods may indicate the same HARQ process ID. The DCI of Method 2-3 may indicate whether the N-th HARQ transmission and the (N+1)-th HARQ transmission are capable of being combined. According to this indication, the UE may combine the N-th HARQ transmission and the (N+1)-th HARQ transmission. In this case, the DCI field of Method 2-3 may indicate the G-RNTI related to the UE-group MBS PDSCH of the N-th HARQ transmission.

PDCCH Repetition and/or PDSCH Repetition (Based on DCI)

When the network repeatedly transmits an MBS PDSCH in a plurality of MBS PDSCH durations (without HARQ feedback), one DCI may schedule multiple MBS PDSCH repetitions. One or multiple TBs may be transmitted in the plurality of MBS PDSCH durations.

Figure 10:
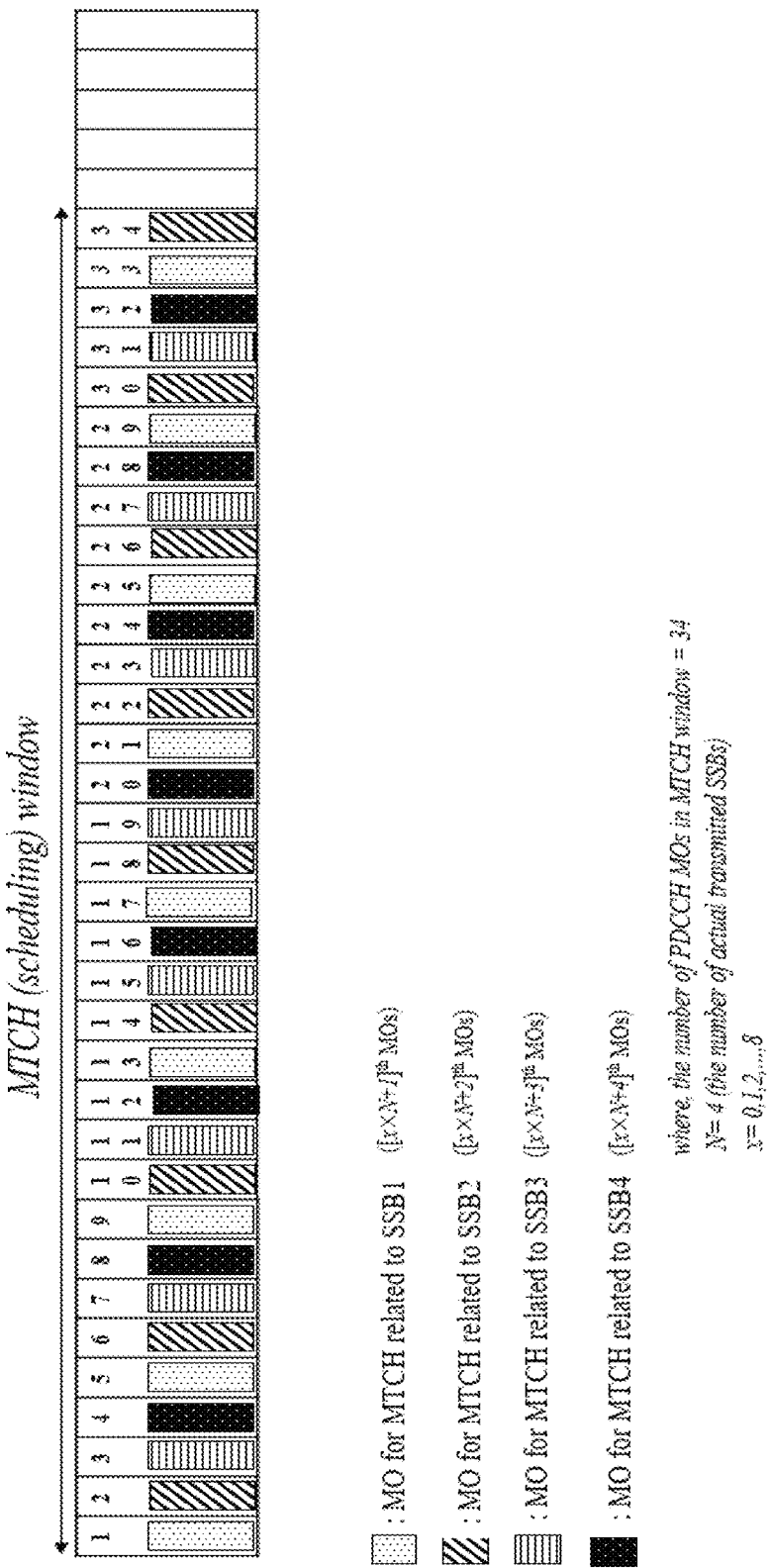
FIG. 10 illustrates repeated transmission of a physical downlink control channel (PDCCH) for a multicast broadcast service (MBS) according to an embodiment of the present invention.

For example, a PDCCH/DCI may also be repeated. The number of DCI repetitions may vary for each G-RNTI. In addition, different PDCCHs/DCIs scheduling different PDSCHs in one PDSCH set may be mapped/associated with different RSs and/or different TCI states. Different DCIs mapped to different RSs/TCI states may be repeated a different number of times. For example, the number of DCI repetitions may be configured differently/independently for each beam. Alternatively, for the same TB, the repetition number of DCI scheduling N-th transmission thereof and the repetition number of DCI scheduling (N+1)-th transmission thereof may be set different from each other. The number of DCI repetitions may be configured in an RRC message, a MAC CE, or DCI. The number of DCI repetitions may be configured differently/independently for each cell, each BWP, or each G-RNTI. Referring to FIG. 10, an MTCH (scheduling) window may be configured for MTCH repetitions (at the slot level). For an MTCH, a PDCCH may be repeatedly transmitted based on a G-RNTI. It is assumed that the number of PDCCH monitoring occasions (MOs) included in the MTCH (scheduling) window is M (e.g., M=34 in FIG. 10). Although the example of FIG. 10 is virtualized as if MOs are contiguous for convenience of description, MO #i and MO #i+1 may not need to be contiguous in the time domain on actual physical resources. Meanwhile, it is assumed that the number of SSBs actually transmitted in an SSB burst is N (e.g., N=4 in the example of FIG. 10). In this case, the M MOs may be associated with at least one of the N SSBs. For example, an (x×N+K)-th MO may be associated with K-th SSB transmission, where x has a value of 0, 1, . . . , X−1, and X may satisfy the following relationship: X=Ceiling (M/N) (e.g., X=9 in the example of FIG. 10). In addition, K has a value of 1, 2, . . . , N. In the example of FIG. 10, 9 MOs are associated with each of SSB 1 and SSB 2, and 8 MOs are associated with each of SSB 3 and SSB 4. The UE may (repeatedly) receive a PDCCH of which the CRC is scrambled with a G-RNTI on MOs associated with an SSB that the UE has received. The example of FIG. 10 may relate to one G-RNTI. When multiple G-RNTIs are configured, the repetition number may be configured independently for each G-RNTI.

The CRC of DCI is scrambled with a C-RNTI or G-RNTI and may include at least some of the following information.

1) HARQ feedback enabled/disabled indicator
    It is indicated whether there is HARQ feedback transmission of the UE for a TB scheduled by DCI (or whether the HARQ feedback transmission is allowed).
    If DCI received from the BS indicates that HARQ feedback is enabled (when there is a special DCI configuration in a received RRC message), the UE may determine that at least one of the following fields: repetition number field and time interval between different PDSCH durations is not included (i.e., omitted) in the DCI. The UE may determine that the DCI includes PUCCH HARQ feedback (A/N) related information such as a PUCCH resource indicator field and a PDSCH-to-HARQ_feedback timing indicator field, instead of the omitted field(s).
    If DCI received from the BS indicates that HARQ feedback is disabled (when there is a special DCI configuration in a received RRC message), the UE may determine that PUCCH HARQ feedback (A/N) related information such as a PUCCH resource indicator field and a PDSCH-to-HARQ_feedback timing indicator field is not included (i.e., omitted) in the corresponding DCI. The UE may determine that the DCI includes the following fields: repetition number and time interval between different PDSCH durations, instead of the omitted field(s).
2) S0: staring symbol of the first PDSCH duration
3) L0: a length of a PDSCH duration in symbol
4) K0: PDCCH to PDSCH timing in slot
5) Repetition number (aggregation factor): the repetition number of a PDSCH duration
    The repetition number of a PDSCH duration scheduled by one DCI may be indicated. N-th DCI and (N+1)-th DCI of which CRCs are scrambled with the same G-RNTI for the same HARQ process ID may indicate different repetition numbers.
6) Time interval between different PDSCH durations
    The time interval between (adjacent/continuous) different PDSCH durations scheduled by (one) DCI may be indicated. N-th DCI and (N+1)-th DCI of which CRCs are scrambled with the same G-RNTI for the same HARQ process ID may schedule PDSCHs repeatedly transmitted at different time intervals.
7) HARQ process ID
    When DCI includes one HARQ process ID, the same (one) TB(s) may be repeatedly transmitted in a plurality of MBS PDSCH durations.
    When DCI includes a plurality of HARQ process IDs, a plurality of TBs may be transmitted once or repeatedly in a plurality of MBS PDSCH durations. For example, if the MBS PDSCH duration is repeated four times according to the fields, TB 1 may be transmitted in the first MBS PDSCH duration and the third MBS PDSCH duration, and TB 2 may be transmitted in the second MBS PDSCH duration and the fourth MBS PDSCH duration.
8) RS index (SSB index or CSI-RS indicator) or TCI states
    An RS or TCI state associated with a plurality of PDSCH durations scheduled by one DCI is indicated.
    When one RS or TCI state is indicated, a plurality of PDSCH durations are all associated with the same RS or TCI state.
    When a plurality of RSs or TCI states are indicated, if there is no specific pattern, a plurality of PDSCH durations are all associated with the same plurality of RSs or TCI states.
    When a plurality of RSs or TCI stats are indicated, a plurality of PDSCH durations may be grouped into a plurality of groups according to a specific pattern, and different groups may be associated with one RS TCI state or a plurality of different RS/TCI states. For example, if the duration is repeated four times, the first MBS PDSCH duration and the third MBS PDSCH duration may be associated with RS #1 or TCI state #1, and the second MBS PDSCH duration and the fourth MBS PDSCH duration may be associated with RS #2 or TCI state #2. Alternatively, when the duration is repeated four times, the first MBS PDSCH duration and the third MBS PDSCH duration may be associated with RSs #1 and #2 or TCI states #1 and #2, and the second MBS PDSCH duration and the fourth MBS PDSCH duration may be associated with RSs #3 and #4 or TCI states #3 and #4.

Figure 9:
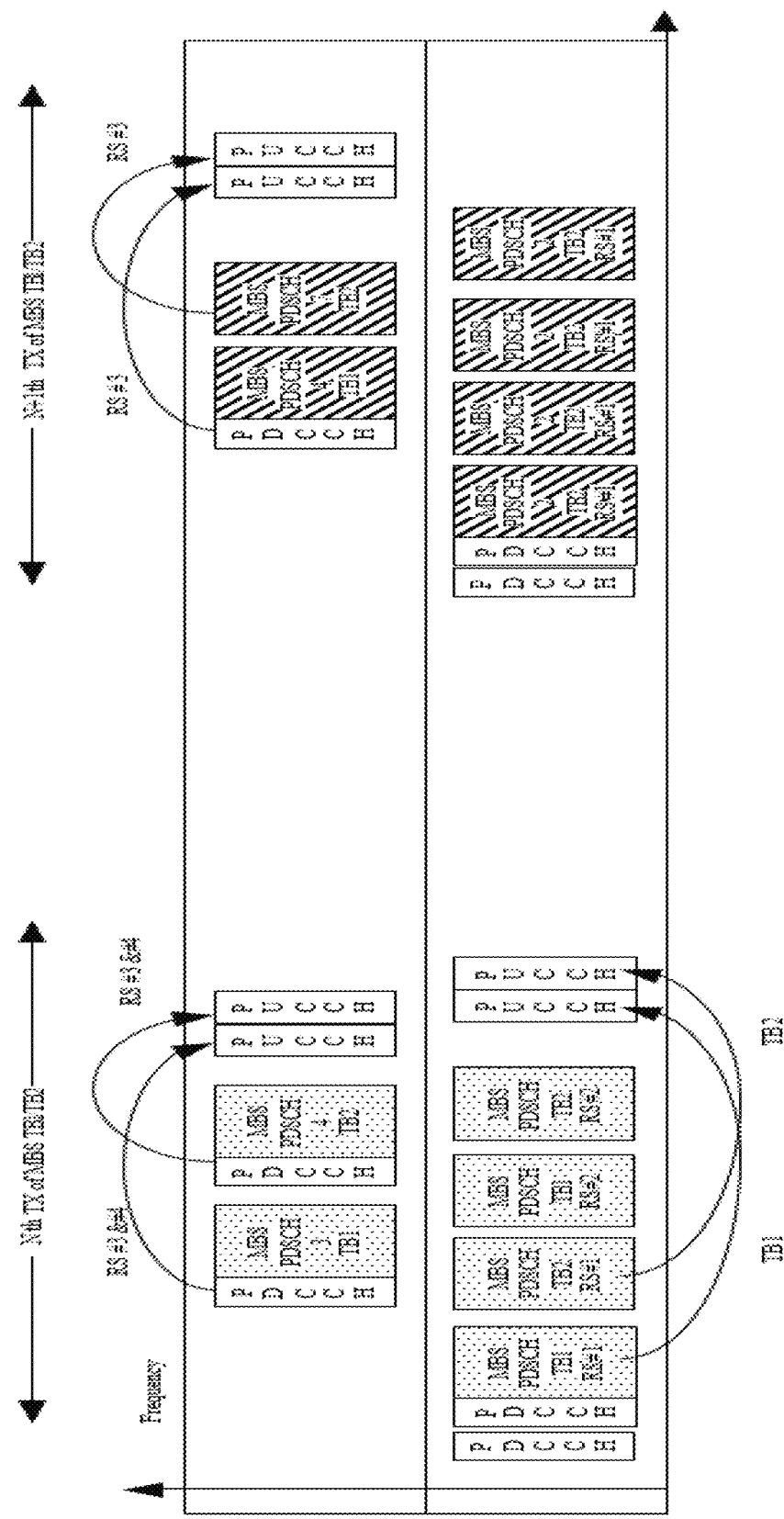
FIG. 9 illustrates resource allocation by downlink control information (DCI) and repeated PDSCH transmission according to an embodiment of the present disclosure.

FIG. 9 illustrates resource allocation for PDSCH repetitions based on DCI and repeated PDSCH transmission according to an embodiment of the present disclosure.

Referring to FIG. 9, the BS may schedule a PDSCH that is repeated four times with RS #1 and RS #2 by transmitting a PDCCH. In this case, the BS may repeatedly transmit the same PDCCH for a corresponding G-RNTI, DL BWP, or DL cell. Accordingly, the UE may receive the repeated PDCCH based on RS #1 or RS #2 and obtain DCIs. When each of the DCIs transmitted with different RSs/TCI states has the same contents and when the qualities of the different RSs/TCI states measured by the UE are above a threshold, the UE may combine the different DCIs related to the RSs/TCI states.

When DCI allocates/indicates one HARQ process ID, the BS may repeatedly transmit one TB over a PDSCH, and the UE may receive the corresponding TB based on a HARQ process mapped to the HARQ process ID. On the other hand, when DCI allocates/indicates two HARQ process IDs, the BS may repeatedly transmit two TBs (e.g., TB 1 and TB 2 of FIG. 9) over repeated PDSCHs, and the UE may receive the two TBs based on different HARQ processes. DCI may allocate a PUCCH resource separately for each TB. For example, the UE may transmit HARQ feedback (A/N) for TB 1 on a first PUCCH resource, and transmit HARQ feedback (A/N) for TB 2 on a second PUCCH resource. If the BS receives an ACK for TB 1 related to RS #1 and RS #2, the BS may retransmit only TB 2. The corresponding TB may be repeatedly transmitted four times only with the same RS, RS #1. In the case of the last retransmission, the BS may disable HARQ feedback over a PDCCH. Alternatively, if no PUCCH resource indicator is provided by DCI, the UE may skip reporting HARQ feedback for the corresponding transmission or may transmit UCI including the HARQ feedback by multiplexing the UCI with a PUSCH.

On the other hand, in FIG. 9, no PDSCH repetition may be required for RS #3 and RS #4. Accordingly, the BS may not repeat a PDSCH resource for N-th retransmission. If the BS receives an ACK for RS #4 but does not receive an ACK for RS #3, the BS may schedule repeated PDSCH transmission only for RS #3. For example, the BS may perform (N+1)-th retransmission for different TBs: TB 1 and TB 2 based on RS #3.

According to the present disclosure, since an MBS PDCCH and/or PDSCH is repeatedly transmitted (regardless of UL feedback), it is possible not only to provide a more robust and reliable MBS but also to minimize unnecessary PUCCH overhead caused by frequent transmission of HARQ feedback by multiple UEs.

Figure 11:
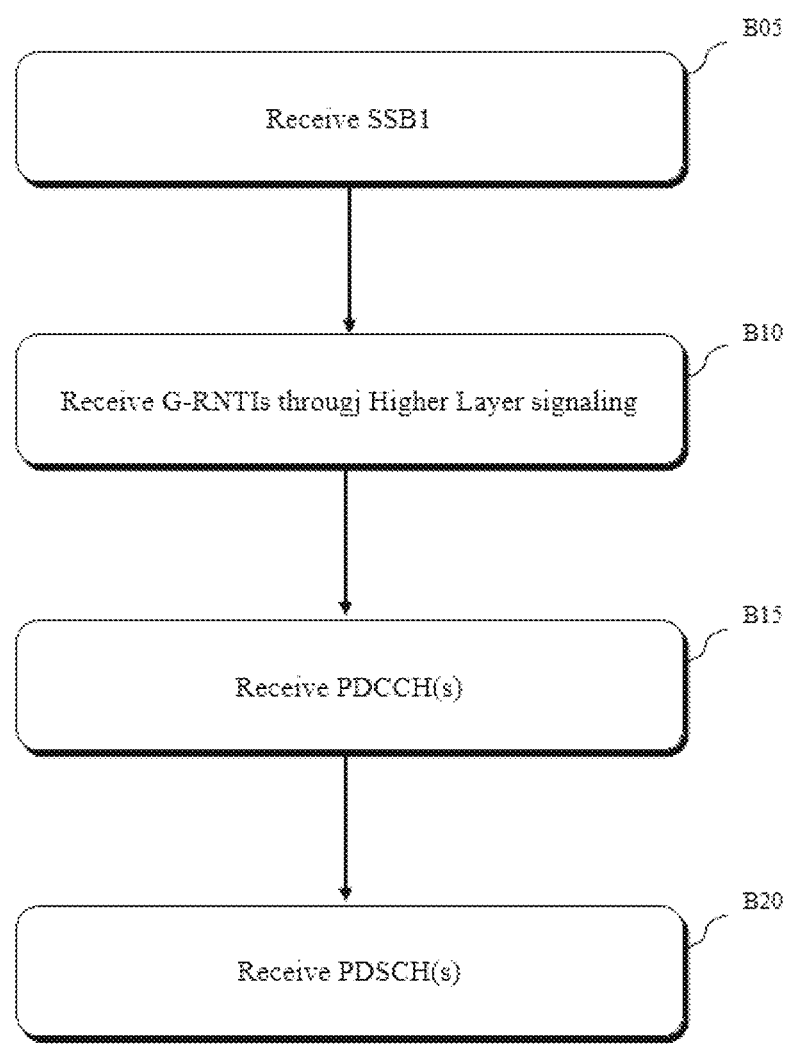
FIGS. 11 and 12 illustrate signal transmission and reception flows according to embodiments of the present disclosure.

FIG. 11 is a diagram for explaining operations of a UE according to an embodiment of the present disclosure. FIG. 11 is a particular implementation of the above-described examples, and thus the scope of the present disclosure is not limited to FIG. 11. The details described above may be referred to in FIG. 11.

Referring to FIG. 11, the UE may receive a first SSB among a plurality of SSBs (B05).

The UE may receive information regarding one or more G-RNTIs through higher layer signaling (B10).

The UE may receive a PDCCH based on the first SSB and the one or more G-RNTIs (B15). The PDCCH received by the UE is a PDCCH for an MBS associated with a first G-RNTI selected from among the one or more G-RNTIs, and the PDCCH for the MBS associated with the first G-RNTI may be repeated for each of the plurality of SSBs. The repetition number of the PDCCH for the MBS for each SSB may be determined based on information configured for the first G-RNTI.

The PDCCH for the MBS received by the UE may be repeated for the first SSB.

A different PDCCH repetition number may be configured for each G-RNTI.

The PDCCH for the MBS may be related to reception of an MTCH, which is an MBS logical channel.

The UE may receive a PDSCH for the MBS based on the PDCCH for the MBS (B20).

The UE may generate a scrambling sequence for the PDSCH for the MBS based on the first G-RNTI.

The first G-RNTI may be set to an identifier (ID) for initialization of the scrambling sequence generation.

The PDSCH for the MBS may be repeated based on the repetition number indicated by UE-group DCI carried by the PDCCH for the MBS.

The repetition number of the PDCCH for the MBS for the first SSB may be different from the repetition number of the PDCCH for the MBS for a second SSB among the plurality of SSBs.

Figure 12:
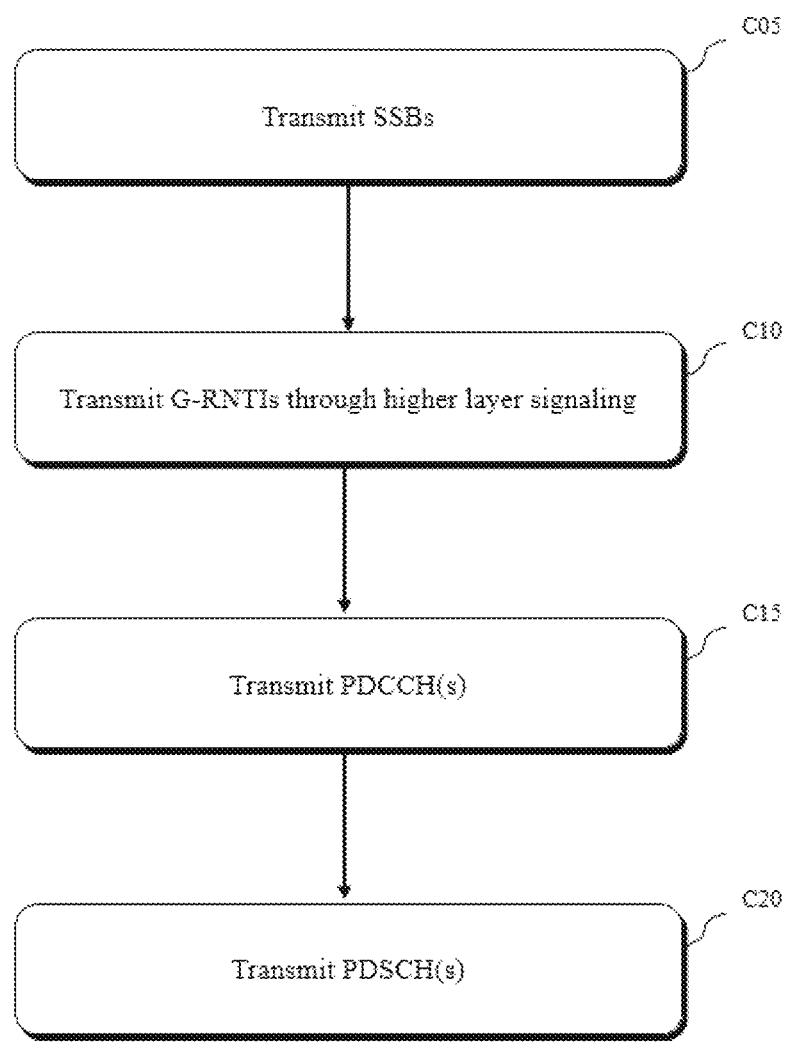

FIG. 12 is a diagram for explaining operations of a BS according to an embodiment of the present disclosure. FIG. 12 is a particular implementation of the above-described examples, and thus the scope of the present disclosure is not limited to FIG. 12. The details described above may be referred to in FIG. 12.

Referring to FIG. 12, the BS may transmit an SS and a PBCH based on a plurality of SSBs (C05).

The BS may transmit information regarding one or more G-RNTIs through higher layer signaling (C10).

The BS may transmit a PDCCH based on the plurality of SSBs and the one or more G-RNTIs (C15).

The transmitted PDCCH includes a PDCCH for an MBS associated with a first G-RNTI among the one or more G-RNTIs, and the PDCCH for the MBS associated with the first G-RNTI may be repeated for each of the plurality of SSBs.

The repetition number of the PDCCH for the MBS for each SSB may be determined based on information configured for the first G-RNTI.

The BS may transmit a PDSCH for the MBS based on the PDCCH for the MBS (C20).

The various details, functions, procedures, proposals, methods, and/or operational flowcharts described in this document may be applied to a variety of fields that require wireless communication/connections (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

Figure 13:
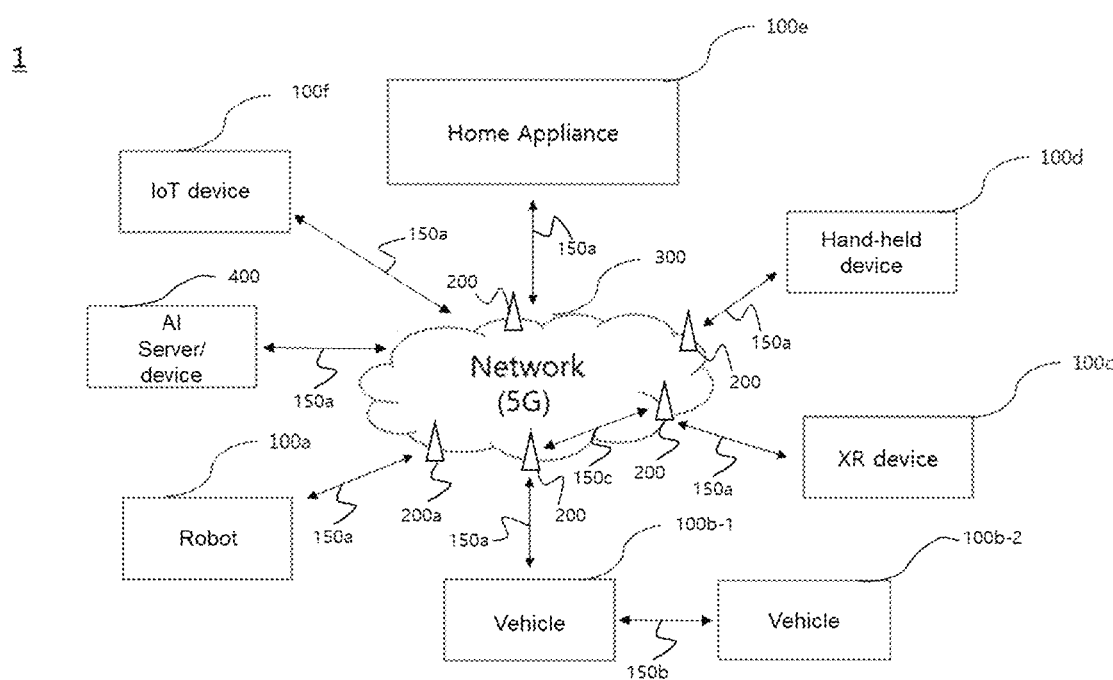
FIGS. 13 to 16 illustrate a communication system 1 and wireless devices applicable to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
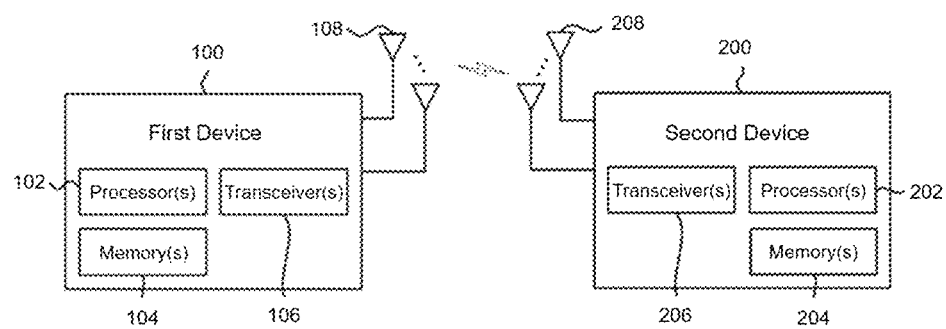

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
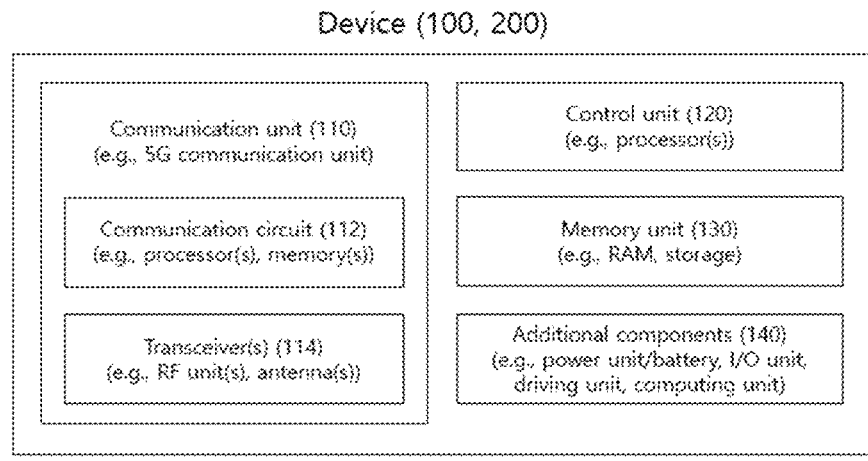

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
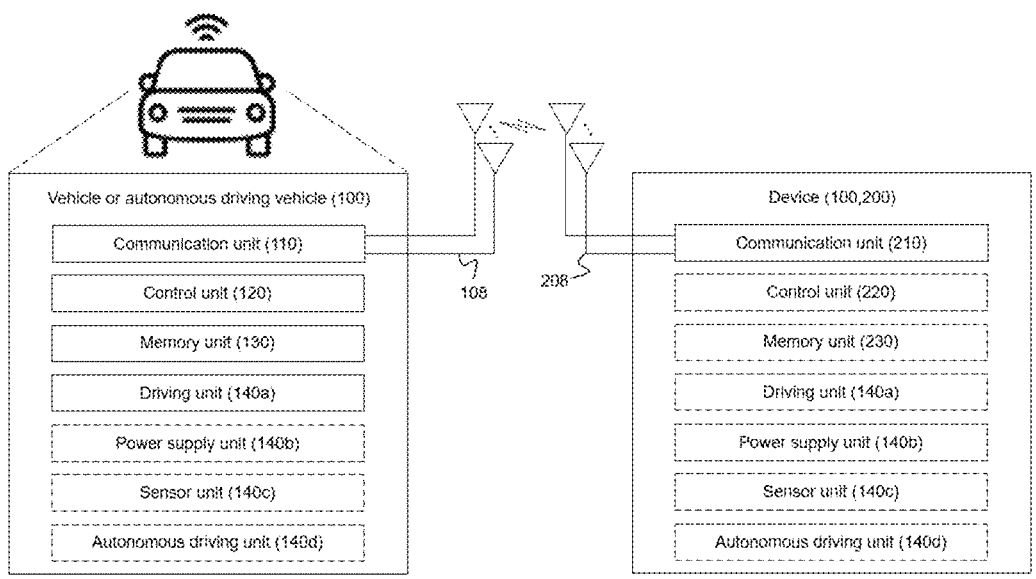

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 17:
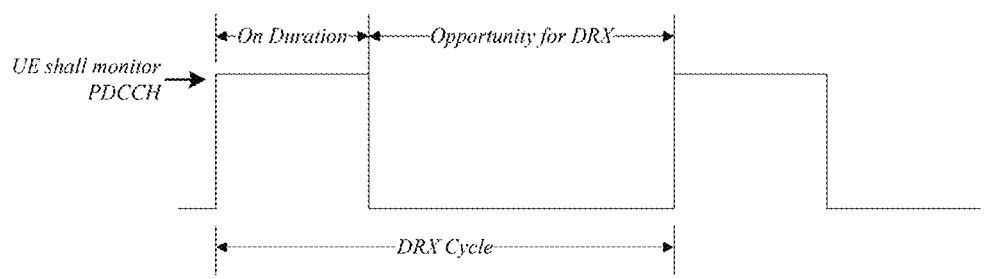
FIG. 17 illustrates discontinuous reception (DRX) operation applicable to the present disclosure.

FIG. 17 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 8 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 8

| | Type of signals | UE procedure |
| --- | --- | --- |
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

What is claimed is:

1. A method of receiving a signal by a user equipment (UE) in a wireless communication system, the method comprising:

receiving information regarding one or more group radio network temporary identifiers (G-RNTIs) through higher layer signaling;

receiving a physical downlink control channel (PDCCH) based on the one or more G-RNTIs; and receiving a physical downlink shared channel (PDSCH) based on the PDCCH, wherein the PDCCH received by the UE is a PDCCH for a multicast broadcast service (MBS) associated with a first G-RNTI from among the one or more G-RNTIs, wherein the PDSCH carries one or more codewords for the MBS, wherein a scrambling sequence for each codeword of the PDSCH is initialized based on a formula '$n_{RNTI}*2^{15} + q*2^{14} + n_{ID}$', where 'q' is a codeword index, wherein based on that the PDCCH is the PDCCH for the MBS which is received based on the first G-RNTI, the UE determines '$n_{RNTI}$' to be the first G-RNTI, and '$n_{ID}$' to be a first scrambling ID, wherein in a case where a higher-layer parameter 'dataScramblingIdentityPDSCH' is configured for the MBS, the first scrambling ID is determined to be the higher-layer parameter 'dataScramblingIdentityPDSCH', and wherein in a case where the higher-layer parameter 'dataScramblingIdentityPDSCH' is not configured for the MBS, the first scrambling ID is determined to be a cell ID.

2. The method of claim 1, wherein the PDCCH for the MBS received by the UE is repeated for a synchronization signal block (SSB).

3. The method of claim 1, wherein a different PDCCH repetition number is configured for each G-RNTI.

4. The method of claim 1, wherein the PDCCH for the MBS is related to reception of a multicast traffic channel (MTCH), which is an MBS logical channel.

5. The method of claim 1, wherein the PDSCH for the MBS is repeated based on a repetition number indicated by UE-group downlink control information (DCI) carried by the PDCCH for the MBS.

6. The method of claim 1, wherein a repetition number of the PDCCH for the MBS is different for each of a plurality of SSBs.

7. The method of claim 1, wherein the PDCCH for the MBS is repeated for each of a plurality of sySSBs, and wherein a repetition number of the PDCCH for the MBS for each SSB is determined based on information configured for the first G-RNTI.

8. A non-transitory computer-readable storage medium having stored thereon a program for executing the method of claim 1.

9. A user equipment (UE) configured to receive a signal in a wireless communication system, the UE comprising:

a transceiver; and a processor configured to control the transceiver to:

receive information regarding one or more group radio network temporary identifiers (G-RNTIs) through higher layer signaling;

receive a physical downlink control channel (PDCCH) based on the first SSB and the one or more G-RNTIs; and receive a physical downlink shared channel (PDSCH) based on the PDCCH, wherein the PDCCH received by the UE is a PDCCH for a multicast broadcast service (MBS) associated with a first G-RNTI from among the one or more G-RNTIs, wherein the PDSCH carries one or more codewords for the MBS, wherein a scrambling sequence for each codeword of the PDSCH is initialized based on a formula '$n_{RNTI}*2^{15} + q*2^{14} + n_{ID}$', where 'q' is a codeword index, wherein based on that the PDCCH is the PDCCH for the MBS which is received based on the first G-RNTI, the processor determines '$n_{RNTI}$' to be the first G-RNTI, and '$n_{ID}$' to be a first scrambling ID, wherein in a case where a higher-layer parameter 'dataScramblingIdentityPDSCH' is configured for the MBS, the first scrambling ID is determined to be the higher-layer parameter 'dataScramblingIdentityPDSCH', and wherein in a case where the higher-layer parameter 'dataScramblingIdentityPDSCH' is not configured for the MBS, the first scrambling ID is determined to be a cell ID.

10. A device configured to control a user equipment (UE) configured to receive a signal in a wireless communication system, the device comprising:
a memory configured to store instructions; and
a processor configured to perform operations by executing the instructions,
wherein the operations performed by the processor comprise:
receiving information regarding one or more group radio network temporary identifiers (G-RNTIs) through higher layer signaling;
receiving a physical downlink control channel (PDCCH) based on the first SSB and the one or more G-RNTIs; and
receiving a physical downlink shared channel (PDSCH) based on the PDCCH,
wherein the received PDCCH is a PDCCH for a multicast broadcast service (MBS) associated with a first G-RNTI from among the one or more G-RNTIs,
wherein the PDSCH carries one or more codewords for the MBS,
wherein a scrambling sequence for each codeword of the PDSCH is initialized based on a formula '$n_{RNTI}*2^{15}+q*2^{14}+n_{ID}$', where 'q' is a codeword index,
wherein based on that the PDCCH is the PDCCH for the MBS which is received based on the first G-RNTI, the processor determines '$n_{RNTI}$' to be the first G-RNTI, and '$n_{ID}$' to be a first scrambling ID,
wherein in a case where a higher-layer parameter 'dataScramblingIdentityPDSCH' is configured for the MBS, the first scrambling ID is determined to be the higher-layer parameter 'dataScramblingIdentityPDSCH', and
wherein in a case where the higher-layer parameter 'dataScramblingIdentityPDSCH' is not configured for the MBS, the first scrambling ID is determined to be a cell ID.

11. A method of transmitting a signal by a base station (BS) in a wireless communication system, the method comprising:
transmitting information regarding one or more group radio network temporary identifiers (G-RNTIs) through higher layer signaling;
transmitting a physical downlink control channel (PDCCH) based on the one or more G-RNTIs; and
transmitting a physical downlink shared channel (PDSCH) based on the PDCCH,
wherein the transmitted PDCCH includes a PDCCH for a multicast broadcast service (MBS) associated with a first G-RNTI among the one or more G-RNTIs,
wherein the PDSCH carries one or more codewords for the MBS,
wherein a scrambling sequence for each codeword of the PDSCH is initialized based on a formula '$n_{RNTI}*2^{15}\pm q*2^{14}+n_{ID}$', where 'q' is a codeword index,
wherein based on that the PDCCH is the PDCCH for the MBS which is transmitted based on the first G-RNTI, the BS determines '$n_{RNTI}$' to be the first G-RNTI, and '$n_{ID}$' to be a first scrambling ID,
wherein in a case where a higher-layer parameter 'dataScramblingIdentityPDSCH' is configured for the MBS, the first scrambling ID is determined to be the higher-layer parameter 'dataScramblingIdentityPDSCH', and
wherein in a case where the higher-layer parameter 'dataScramblingIdentityPDSCH' is not configured for the MBS, the first scrambling ID is determined to be a cell ID.

12. A base station (BS) configured to transmit a signal in a wireless communication system, the BS comprising:
a transceiver; and
a processor configured to control the transceiver to:
transmit information regarding one or more group radio network temporary identifiers (G-RNTIs) through higher layer signaling;
transmit a physical downlink control channel (PDCCH) based on the plurality of SSBs and the one or more G-RNTIs; and
transmit a physical downlink shared channel (PDSCH) based on the PDCCH,
wherein the transmitted PDCCH includes a PDCCH for a multicast broadcast service (MBS) associated with a first G-RNTI among the one or more G-RNTIs,
wherein the PDSCH carries one or more codewords for the MBS,
wherein a scrambling sequence for each codeword of the PDSCH is initialized based on a formula '$n_{RNTI}*2^{15}+q*2^{14}+n_{ID}$', where 'q' is a codeword index,
wherein based on that the PDCCH is the PDCCH for the MBS which is transmitted based on the first G-RNTI, the BS determines '$n_{RNTI}$' to be the first G-RNTI, and '$n_{ID}$' to be a first scrambling ID,
wherein in a case where a higher-layer parameter 'dataScramblingIdentityPDSCH' is configured for the MBS, the first scrambling ID is determined to be the higher-layer parameter 'dataScramblingIdentityPDSCH', and
wherein in a case where the higher-layer parameter 'dataScramblingIdentityPDSCH' is not configured for the MBS, the first scrambling ID is determined to be a cell ID.

* * * * *